(12) United States Patent
Herzog et al.

(10) Patent No.: US 11,472,114 B2
(45) Date of Patent: Oct. 18, 2022

(54) METHOD FOR CONTROLLING OPERATION OF AT LEAST ONE ADDITIVE MANUFACTURING APPARATUS FOR ADDITIVELY MANUFACTURING OF THREE-DIMENSIONAL OBJECTS

(71) Applicant: CONCEPT LASER GMBH, Lichtenfels (DE)

(72) Inventors: Frank Herzog, Lichtenfels (DE); Florian Bechmann, Lichtenfels (DE); Markus Lippert, Lichtenfels (DE); Ralf Hetzel, Bad Staffelstein (DE)

(73) Assignee: CONCEPT LASER GMBH, Lichtenfels (DE)

( * ) Notice: Subject to any disclaimer, the term of this patent is extended or adjusted under 35 U.S.C. 154(b) by 176 days.

(21) Appl. No.: 16/041,407

(22) Filed: Jul. 20, 2018

(65) Prior Publication Data

US 2019/0022949 A1 Jan. 24, 2019

(30) Foreign Application Priority Data

Jul. 21, 2017 (EP) .................................... 17182656

(51) Int. Cl.
*B29C 64/393* (2017.01)
*B33Y 10/00* (2015.01)
(Continued)

(52) U.S. Cl.
CPC ............ *B29C 64/393* (2017.08); *B22F 10/20* (2021.01); *B33Y 50/02* (2014.12); *G06F 21/31* (2013.01);
(Continued)

(58) Field of Classification Search
None
See application file for complete search history.

(56) References Cited

U.S. PATENT DOCUMENTS

2008/0103622 A1* 5/2008 Hanses .............. G05B 19/4183
700/116
2009/0164039 A1 6/2009 Jung
(Continued)

FOREIGN PATENT DOCUMENTS

JP 2012/158089 A 8/2012
JP 2015/229311 A 12/2015
WO WO2016/063665 A1 4/2016

OTHER PUBLICATIONS

European Search Report Corresponding to Application No. 17182656 dated Jan. 18, 2018.
(Continued)

*Primary Examiner* — Jennifer L Norton
(74) *Attorney, Agent, or Firm* — Dority & Manning, P.A.

(57) ABSTRACT

Method for controlling operating of at least one additive manufacturing apparatus (1) for additively manufacturing of three-dimensional objects is provided by means of successive layerwise selective irradiation and consolidation of layers of a powdered build material which can be consolidated by means of an energy beam, embodiments including exemplary steps of: supplying authorization data (AD) which contains at least one authorization parameter that authorizes the operation of at least one additive manufacturing apparatus (1) or at least one functional unit (2-7) of the at least one additive manufacturing apparatus (1) from an external data supply source (10), transmitting the authorization data (AD) from the external data supply source (10) to a control unit (8) of the at least one additive manufacturing apparatus (1), and controlling operation of the additive manufacturing apparatus (1) or the at least one functional unit (2-7).

11 Claims, 2 Drawing Sheets

(51) Int. Cl.
B33Y 50/02 (2015.01)
G06F 21/31 (2013.01)
B22F 10/20 (2021.01)
B22F 10/30 (2021.01)
B29C 64/135 (2017.01)
B29C 64/153 (2017.01)

(52) U.S. Cl.
CPC ............ *B22F 10/30* (2021.01); *B29C 64/135* (2017.08); *B29C 64/153* (2017.08); *B33Y 10/00* (2014.12)

(56) References Cited

U.S. PATENT DOCUMENTS

| | | | | |
|---|---|---|---|---|
| 2009/0165127 A1* | 6/2009 | Jung | ..................... | G06Q 10/06 726/21 |
| 2009/0165147 A1* | 6/2009 | Jung | ..................... | G06F 21/10 726/29 |
| 2010/0031351 A1* | 2/2010 | Jung | ..................... | G06F 21/10 726/21 |
| 2010/0179985 A1* | 7/2010 | Bellardie | ................ | H04L 67/18 709/203 |
| 2014/0117585 A1* | 5/2014 | Douglas | ................ | B33Y 30/00 264/401 |
| 2016/0180061 A1 | 6/2016 | Pogorelik et al. | | |
| 2016/0259306 A1* | 9/2016 | Pangrazio, III | ....... | H04L 9/3247 |
| 2016/0260001 A1* | 9/2016 | Flores | .................... | G06K 1/121 |
| 2016/0332376 A1* | 11/2016 | Ramirez Muela | ..... | B33Y 70/00 |
| 2017/0157859 A1 | 6/2017 | Mahdavi et al. | | |
| 2017/0232669 A1 | 8/2017 | Watanabe et al. | | |
| 2017/0311164 A1* | 10/2017 | Shin | ....... | G06K 19/14 |
| 2019/0081792 A1* | 3/2019 | Thom | ................... | H04L 9/3234 |
| 2020/0215758 A1* | 7/2020 | Schumann | ............... | H04N 1/387 |
| 2020/0326683 A1* | 10/2020 | Oligschlaeger | ......... | H04L 9/088 |
| 2020/0334919 A1* | 10/2020 | Bowen | .................... | G06T 11/60 |
| 2021/0178694 A1* | 6/2021 | Granados Asensio | ...................... | B33Y 50/00 |
| 2022/0121173 A1* | 4/2022 | Pelage | .................. | H04L 9/3278 |

OTHER PUBLICATIONS

Machine Translated Japanese Office Action Corresponding to Application No. 2017218207 dated Aug. 15, 2019.

\* cited by examiner

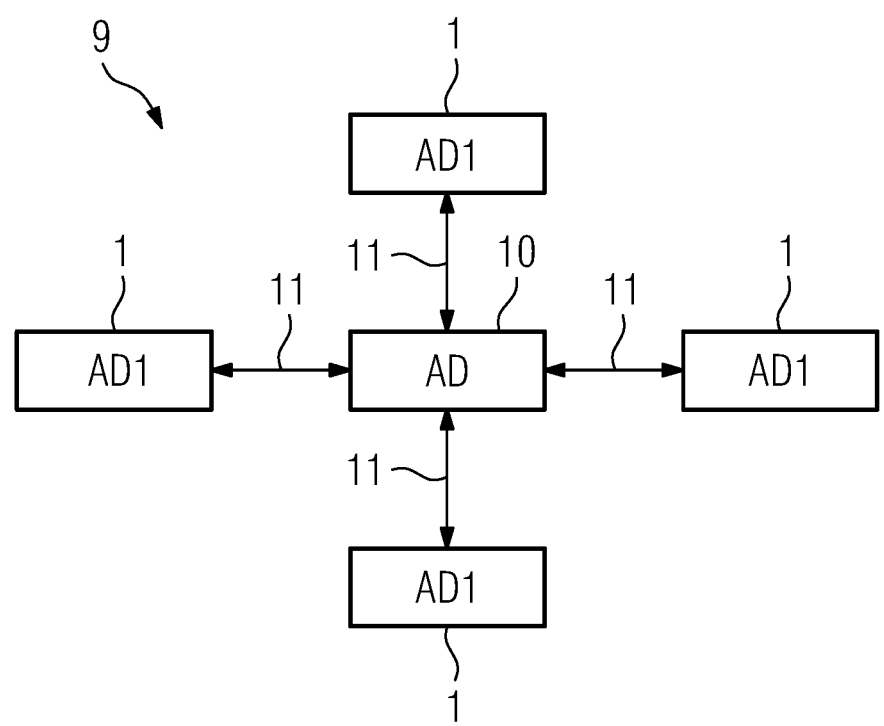

METHOD FOR CONTROLLING OPERATION OF AT LEAST ONE ADDITIVE MANUFACTURING APPARATUS FOR ADDITIVELY MANUFACTURING OF THREE-DIMENSIONAL OBJECTS

CROSS-REFERENCE TO RELATED APPLICATIONS

This application claims priority to European Patent Application serial no. 17 182 656.3 filed Jul. 21, 2017, the contents of which is incorporated herein by reference in its entirety as if set forth verbatim.

The invention relates to a method for controlling operation of at least one additive manufacturing apparatus for additively manufacturing of three-dimensional objects by means of successive layerwise selective irradiation and consolidation of layers of a powdered build material which can be consolidated by means of an energy beam.

Operating additive manufacturing apparatuses for additively manufacturing of three-dimensional objects can be challenging since a plurality of parameters, e.g. process parameters, have to be thoroughly controlled in order to obtain objects with desired properties. Some industries, e.g. the automotive-, aviation-, and medical-industry, demand high quality standards for additively manufactured objects and a complete documentation of each additive manufacturing process. This applies particularly for additive manufacturing networks comprising a plurality of additive manufacturing apparatuses located remote from each other, e.g. at remote additive manufacturing sites, i.e. additive manufacturing sites which may be located in different parts of a building, town, country, continent, etc.

Particularly, for a respective additive manufacturing network comprising a plurality of additive manufacturing apparatuses located remote from each other, it has to be assured that the quality and documentation demands can be fulfilled at each additive manufacturing site. The operator, owner, or manufacturer of parts, e.g. for the automotive-, aviation-, and medical-industry, of a respective additive manufacturing network has to assure that each additive manufacturing apparatus of the additive manufacturing network is operated with set object parameters, set process parameters, set build material parameters, etc.

It is the object of the present invention to provide a method for operating at least one additive manufacturing apparatus for additively manufacturing of three-dimensional objects allowing for a thorough control of operation of the respective apparatus.

The object is achieved by a method for controlling operation of at least one additive manufacturing apparatus for additively manufacturing of three-dimensional objects according to Claim 1. The dependent Claims relate to possible embodiments of the method according to Claim 1.

The method described herein refers to controlling operation of at least one additive manufacturing apparatus for additively manufacturing of three-dimensional objects ("objects"), e.g. technical parts or part assemblies, by means of successive layerwise selective irradiation and consolidation of layers of a powdered build material which can be consolidated by means of an energy beam), i.e. typically an electron- or laser beam. A respective additive manufacturing apparatus, which may be embodied as a selective laser sintering apparatus ("SLS-apparatus"), a selective laser melting apparatus ("SLM-apparatus") or a selective electron beam melting apparatus ("SEBM-apparatus"), for instance may be a part of an additive manufacturing network comprising a plurality of additive manufacturing apparatuses located remote from each other, e.g. at remote additive manufacturing sites, i.e. additive manufacturing sites which may be located in different parts of a building, town, country, continent, etc. Thus, the method may also refer to controlling operation of a plurality of additive manufacturing apparatuses, which may be located at different additive manufacturing sites, i.e. additive manufacturing sites which are located in different parts of a building, town, country, continent, etc., or controlling operation of a respective additive manufacturing network.

As will be apparent from the following description of the method, controlling operation of at least one additive manufacturing apparatus also may comprise controlling operation of at least one hard- and/or software embodied functional unit of the additive manufacturing apparatus, e.g. a (central) control unit for setting process parameters of the additive manufacturing apparatus, a build material application unit for applying layers of a build material in a build area of the additive manufacturing apparatus, an irradiation unit for selectively irradiating and thereby, selectively consolidating layers of build material in a build area of the additive manufacturing apparatus with at least one energy beam, a streaming unit for creating a process gas stream, particularly through a process chamber of the additive manufacturing apparatus, a tempering unit for tempering (cooling and/or heating) build material and/or wall portions of the additive manufacturing apparatus or wall portions of a powder module, e.g. a dose module, build module, overflow module, an unpacking unit for unpacking built objects from surrounding build material, a build material handling unit for handling of build material of the additive manufacturing apparatus, etc. Each functional unit may comprise a number of sub-units capable of implementing a sub-functionality of the respective general functionality of the respective functional unit.

According to a first step of the method, authorization data which contains at least one authorization parameter that authorizes the operation of at least one additive manufacturing apparatus or at least one functional unit of the at least one apparatus is supplied by/from an external data supply source. Hence, operation of the additive manufacturing apparatus and/or the at least one functional unit thereof is only possible when it is authorized by the authorization data and a respective authorization parameter thereof, respectively. This also means that changes to the operation, particularly changes to at least operational parameter, of the additive manufacturing apparatus and/or the at least one functional unit thereof is only possible when it is authorized by the authorization data and a respective authorization parameter thereof, respectively. The authorization data can thus, be understood as authorized control data for controlling operation of the additive manufacturing apparatus and/or of at least one functional unit thereof. An authorization parameter can thus, be understood as an authorized control parameter for controlling operation of the additive manufacturing apparatus and/or of at least one functional unit thereof. Authorization data and/or authorization parameter can be pre-defined or pre-set, e.g. by an owner, operator, manufacturer. Typically, pre-defined or pre-set authorization parameters cannot be further modified by a third person.

Typically, the external data supply source does not form part of the additive manufacturing apparatus or functional unit thereof whose operation is to be controlled. The external data supply source may be located at an authorized entity, e.g. an operator of the additive manufacturing apparatus to be operated, an owner of the additive manufacturing apparatus to be operated, a manufacturer of the additive manufacturing apparatus to be operated and/or a distributor authorized by the manufacturer of the additive manufacturing apparatus to be operated and/or allocated to an operator, owner, manufacturer or distributor, respectively. The authorization data may thus, be supplied from the operator, owner, manufacturer or distributor of the additive manufacturing apparatus to be operated. The external data supply source may thus, be remote from the additive manufacturing apparatus and/or functional unit whose operation shall be controlled.

The external data supply source may also be capable of creating/generating, e.g. programming, respective authorization data, before supplying, i.e. typically transmitting, them to an additive manufacturing apparatus or a respective functional unit thereof in either case.

According to a second step of the method, the authorization data is transmitted from the external supply source to a control unit of the at least one additive manufacturing apparatus. The hard- and/or software embodied control unit is configured to control operation of the additive manufacturing apparatus or the at least one functional unit thereof. The control unit is configured to process transmitted authorization data so as to generate authorized control data for controlling operation of the additive manufacturing apparatus and/or of at least one functional unit thereof. Transmittal of authorization data is typically executed by appropriate transceiving devices, i.e. devices which are configured to transmit and/or receive data, assigned to or incorporated in the external data supply source and the control unit of the additive manufacturing apparatus. Transmittal may be based on any wired or wireless, if need be encoded, transmitting technology based on any communication standards, protocols, network, respectively.

According to a third step of the method, operation of the additive manufacturing apparatus and/or the at least one functional unit thereof is controlled based on the transmitted authorization data. In such a manner, operation of the additive manufacturing apparatus and/or functional units thereof can be controlled since operation of the additive manufacturing apparatus and/or functional units thereof is only possible if it is authorized by the authorization data and authorization parameters, respectively. Since the authorization data and authorization parameters, respectively can be supplied from a remote location, an operator, owner, manufacturer, distributor or any other authorized person or entity is able to control and document operation of the additive manufacturing apparatus from a remote location. As mentioned above, operation of the additive manufacturing apparatus and/or the at least one functional unit thereof as well as changes to the operation, i.e. particularly, changes to at least operational parameter, are only possible when they are authorized by the authorization data.

Hence, an operator, owner, manufacturer, distributor of an additive manufacturing network comprising a plurality of additive manufacturing apparatuses located remote from each other or a manufacturer of parts, e.g. for the automotive-, aviation-, and medical-industry, can assure proper quality and documentation at each additive manufacturing site. The operator, owner, manufacturer, distributor of a respective additive manufacturing network is also able to document that each additive manufacturing apparatus of the additive manufacturing network is or was operated with e.g. set object parameters, set process parameters, set build material parameters, set personnel, etc. By means of respective authorization data, the operator, owner, manufacturer, distributor can also allocate specific build jobs to specific additive manufacturing apparatuses which are (only) authorized to be operated for processing the respective build job.

A respective authorization parameter may be or may comprise an object authorization parameter. The object authorization parameter may refer to at least one three-dimensional object and/or at least one object parameter which is authorized to be used for additive manufacturing with the at least one additive manufacturing apparatus or at least one specific additive manufacturing apparatus of an additive manufacturing network.

A respective object authorization parameter may contain/describe the general kind of object which is authorized to be additively manufactured with the at least one additive manufacturing apparatus or a specific additive manufacturing apparatus, respectively. Hence, an object authorization parameter may authorize specific kinds of objects which may solely manufactured with the respective additive manufacturing apparatus. As an example, an object authorization parameter may authorize a certain kind of technical component, e.g. a certain type of a clamp, so that solely this kind of technical component is authorized and thus, can be manufactured with the respective additive manufacturing apparatus. Other types of technical components, e.g. other clamps, or non-technical components, e.g. jewelry, are not authorized and thus, cannot be manufactured with the respective additive manufacturing apparatus in this exemplary case.

A respective object authorization parameter may additionally or alternatively contain/describe the geometrical, i.e. constructive and/or functional, properties of at least one object which is generally authorized to be additively manufactured with the at least one additive manufacturing apparatus. Hence, an object authorization parameter may authorize specific geometrical properties of an object authorized to be manufactured with the respective additive manufacturing apparatus. As an example, an object authorization parameter may authorize a specific geometrical shape, e.g. base shape, length, width, height, of an object or a portion of an object authorized to be manufactured with the respective additive manufacturing apparatus so that solely objects of this specific geometrical shape are authorized and thus, can be manufactured with the respective additive manufacturing apparatus. Objects having other geometrical shapes are not authorized and thus, cannot be manufactured with the respective additive manufacturing apparatus in this exemplary case.

A respective object authorization parameter may additionally or alternatively contain/describe a minimum or maximum manufacturing number of an object which is generally authorized to be additively manufactured with the at least one additive manufacturing apparatus. The minimum or maximum manufacturing number may indicate how many units of the authorized object are authorized to be manufactured at the minimum or maximum. Hence, an object authorization parameter may authorize a minimum or maximum number of units of an object authorized to be manufactured with the respective additive manufacturing apparatus. As an example, an object authorization parameter may authorize a maximum number of nine units of a specific object authorized to be manufactured with the respective additive manufacturing apparatus so that solely of an amount of nine units of the respective object are authorized and thus, can be manufactured with the respective additive manufacturing apparatus. More than nine units of the respective object are not authorized and thus, cannot be manufactured with the respective additive manufacturing apparatus in this exemplary case.

A respective authorization parameter may additionally or alternatively be or comprise a build material authorization parameter. The build material authorization parameter may refer to at least one build material and/or at least one build material parameter which is authorized to be used for additive manufacturing with the at least one additive manufacturing apparatus or at least one specific additive manufacturing apparatus of an additive manufacturing network.

A respective build material authorization parameter may contain/describe at least one chemical parameter of the build material which is authorized to be used for additive manufacturing. Hence, a build material authorization parameter may authorize a specific chemical parameter of a build material, e.g. chemical composition and/or chemical reactivity, authorized to be used. As an example, a build material authorization parameter may authorize a specific iron-based metal alloy so that solely this iron-based metal alloy can be used for additive manufacturing. Build materials having other chemical compositions are not authorized and thus, cannot be used for additive manufacturing in this exemplary case. A possibly required detection of the chemical parameters of the build material can be obtained by an appropriate detection/determination/sensing unit which may be assigned to the control unit of the respective additive manufacturing apparatus.

A respective build material authorization parameter may additionally or alternatively contain/describe at least one physical parameter of the build material which is authorized to be used for additive manufacturing. Hence, a build material authorization parameter may authorize specific physical properties of a build material, e.g. density, humidity, magnetism, temperature, authorized to be used. As an example, a build material authorization parameter may authorize a specific temperature of a build material so that solely build materials having the respective temperature can be used for additive manufacturing. Build materials having other, i.e. typically lower, temperatures are not authorized and thus, cannot be used for additive manufacturing in this exemplary case. A possibly required detection of physical parameters of the build material can be obtained by an appropriate detection/determination/sensing unit which may be assigned to the control unit of the respective additive manufacturing apparatus.

A respective build material authorization parameter may additionally or alternatively contain/describe at least one grain/particle parameter of the build material which is authorized to be used for additive manufacturing. Hence, a build material authorization parameter may authorize a specific grain/particle parameter, e.g. grain shape, minimum grain size, maximum grain size, grain size distribution, of a build material authorized to be used. As an example, a build material authorization parameter may authorize a specific grain size distribution so that a build material of the respective grain size distribution can be used for additive manufacturing. Build materials having other grain size distributions are not authorized and thus, cannot be used for additive manufacturing in this exemplary case. A possibly required detection of the grain size parameters of the build material can be obtained by an appropriate detection/determination/ sensing unit which may be assigned to the control unit of the respective additive manufacturing apparatus.

A respective authorization parameter may additionally or alternatively be or comprise a process authorization parameter. The process authorization parameter may refer to at least one process parameter which is authorized to be used for additive manufacturing with the at least one additive manufacturing apparatus or at least one specific additive manufacturing apparatus of an additive manufacturing network.

A respective process authorization parameter may contain/describe at least one energy beam parameter of an energy beam which is authorized to be used for additive manufacturing. Hence, a process authorization parameter may authorize a specific energy beam parameter of an energy beam, e.g. energy beam intensity, motion profile relative to a build material layer, velocity along build a material layer, authorized to be used. As an example, an energy beam parameter may authorize a specific energy beam intensity of an energy beam so that a solely an energy beam of the respective energy beam intensity can be used for additive manufacturing. Energy beams having other energy beam intensities are not authorized and thus, cannot be used for additive manufacturing in this exemplary case. A possibly required detection of the energy beam intensity of the energy beam can be obtained by an appropriate detection/determination/sensing unit which may be assigned to the control unit of the respective additive manufacturing apparatus.

A respective process authorization parameter may additionally or alternatively contain/describe a minimum or maximum number of energy beams which is authorized to be used for additive manufacturing. The minimum or maximum number indicates how many energy beams are authorized to be used at the minimum or at the maximum. Hence, a process authorization parameter may authorize a minimum or maximum number of energy beams authorized to be used. As an example, a process authorization parameter may authorize a minimum number of two energy beams to be used so that solely an amount of at least two energy beams are authorized and thus, can be used. Less than two energy beams are not authorized and thus, cannot be used in this exemplary case.

A respective process authorization parameter may additionally or alternatively contain/describe at least one build material application parameter, e.g. a clearance (defining the thickness of a layer) of a powder application unit to the build area, a motion profile of a powder application unit relative to the build area, the velocity of a powder application unit relative to the build area, which is authorized to be used for additive manufacturing. As an example, a build material application parameter may authorize a specific clearance of a powder application unit, particularly a blade-like powder application device, relative to a build area so that a solely a powder application unit having the respective clearance can be used for additive manufacturing. Powder application units having other clearances are not authorized and thus, cannot be used for additive manufacturing in this exemplary case. A possibly required detection of the build material application parameter can be obtained by an appropriate detection/determination/sensing unit which may be assigned to the control unit of the respective additive manufacturing apparatus.

A respective process authorization parameter may additionally or alternatively contain/describe at least one ambient parameter of the process chamber and/or at least one powder module of the additive manufacturing apparatus which is authorized to be used for additive manufacturing. Hence, an ambient parameter may authorize a specific ambient parameter of the process chamber and/or at least one powder module, e.g. inert atmosphere, humidity, temperature, pressure, authorized to be used. As an example, an ambient parameter may authorize a specific (inert) atmosphere or (inert) process gas in the process chamber of an additive manufacturing apparatus so that solely the respective (inert) atmosphere or (inert) process gas can be used for additive manufacturing. Other (inert) atmospheres or (inert) process gases are not authorized and thus, cannot be used for additive manufacturing in this exemplary case. A possibly required detection of ambient parameters can be obtained by an appropriate detection/determination/sensing unit which may be assigned to the control unit of the respective additive manufacturing apparatus.

A respective authorization parameter may additionally or alternatively be or comprise an apparatus status authorization parameter. The apparatus status authorization parameter may refer to at least one check-, service- or calibration-status of the additive manufacturing apparatus or at least one functional unit thereof which needs to be fulfilled to authorize operation. Hence, operation of the additive manufacturing apparatus or a respective functional unit thereof may only be authorized if a respective check-, service- or calibration-status is fulfilled. As an example, a respective check-, service- or calibration-status may refer to a respective check-, service- or calibration-status of the irradiation unit.

A respective authorization parameter may additionally or alternatively be or comprise a time and/or location authorization parameter. The time and/or location authorization parameter may refer to at least one time or time interval and/or location in which operation of the at least one additive manufacturing apparatus or at least one functional unit thereof is authorized. Hence, operation of the additive manufacturing apparatus or a functional unit thereof may only be authorized at certain times or within certain time intervals, e.g. at certain times, days, months, years, etc., and/or at certain locations or manufacturing sites, e.g. in certain buildings, towns, countries, continents, respectively. As an example, operation of an apparatus can only be authorized during regular working hours of a manufacturing plant in a specific region of a specific country.

A respective authorization parameter may additionally or alternatively be or comprise a user authorization parameter. The user authorization parameter may refer to at least one user parameter of at least one user which is authorized to operate at least one additive manufacturing apparatus or at least one functional unit of the apparatus.

A respective user authorization parameter may contain/describe a degree of education and/or position and/or personal data, e.g. age, sex, seniority, etc., of a user willing to operate at least one additive manufacturing apparatus. Hence, a user authorization parameter may authorize a specific user, e.g. an employee, authorized to operate the additive manufacturing apparatus and/or a functional unit thereof. As an example, only user of a certain degree of education and seniority may be authorized to operate the additive manufacturing apparatus, e.g. start, change, approve build jobs, so that solely the respective user can operate the apparatus. Other users are not authorized and thus, cannot operate the apparatus in this exemplary case.

The user authorization parameter may be approved during a login procedure of a potential user of the additive manufacturing apparatus at a login interface, e.g. at the additive manufacturing apparatus. A login procedure may comprise detecting, e.g. scanning, of user identification means, e.g. an ID-card, biometric features, e.g. finger-print, retina, etc., of the user. A successful login procedure may require approval of at least one user authorization parameter.

Authorization data information specifying the authorization data used during an authorized additive manufacturing process can be generated at/with an additive manufacturing apparatus. The generated authorization data information may be provided as a marker, e.g. a serial number, geometrical marker, a bar-code, a QR-code, etc. to an object which was manufactured by an authorized additive manufacturing apparatus. In such a manner, documentation of additive manufacturing processes can be achieved in reliable manner since all relevant information, i.e. particularly the authorization data used during an authorized additive manufacturing process, can be "stored" on an object which was manufactured by an authorized additive manufacturing apparatus. Respective markers can be additively built.

In order to protect the authorization data from unauthorized access, the authorization data can be deleted after completion of a specific additive manufacturing process or a specific build job, respectively in which at least one object was additively built. Additionally or alternatively, the authorization data can be sent back to the external data supply source after completion of a specific additive manufacturing process. Further additionally or alternatively, the authorization data can be processed in such a manner that it cannot be accessed by a user of the additive manufacturing apparatus.

The invention further relates to an additive manufacturing apparatus for additively manufacturing of three-dimensional objects by means of successive layerwise selective irradiation and consolidation of layers of a powdered build material which can be consolidated by means of an energy beam. The additive manufacturing apparatus comprises a control unit which is configured to process transmitted authorization data which contains at least one authorization parameter that authorizes the operation of the additive manufacturing apparatus or at least one functional unit of the additive manufacturing apparatus supplied from an external data supply source, and control operation of the additive manufacturing apparatus or the at least one functional unit of the additive manufacturing apparatus based on the received authorization data.

The invention moreover relates to an additive manufacturing network, comprising at least one external data supply source and a plurality of additive manufacturing apparatuses for additively manufacturing of three-dimensional objects by means of successive layerwise selective irradiation and consolidation of layers of a powdered build material which can be consolidated by means of an energy beam located remote from each other. Each additive manufacturing apparatus comprises a control unit which is configured to process transmitted authorization data which contains at least one authorization parameter that authorizes the operation of the additive manufacturing apparatus or at least one functional unit of the additive manufacturing apparatus supplied from the external data supply source, and control operation of the additive manufacturing apparatus (1) or the at least one functional unit of the additive manufacturing apparatus (1) based on the received authorization data.

Both the additive manufacturing apparatus and the additive manufacturing network are capable of executing the method described herein. Hence, all annotations concerning the method also apply to the additive manufacturing apparatus and the additive manufacturing network in analogous manner.

Exemplary embodiments of the invention will be described with respect to the fig., whereby:

FIG. 2 is a principle drawing of an additive manufacturing network.

FIG. 1 is a principle drawing of an additive manufacturing apparatus 1. The additive manufacturing apparatus 1 is configured for additively manufacturing of three-dimensional objects by means of successive layerwise selective irradiation and consolidation of layers of a powdered build material which can be consolidated by means of an energy beam, e.g. an electron or laser beam.

Figure 1:
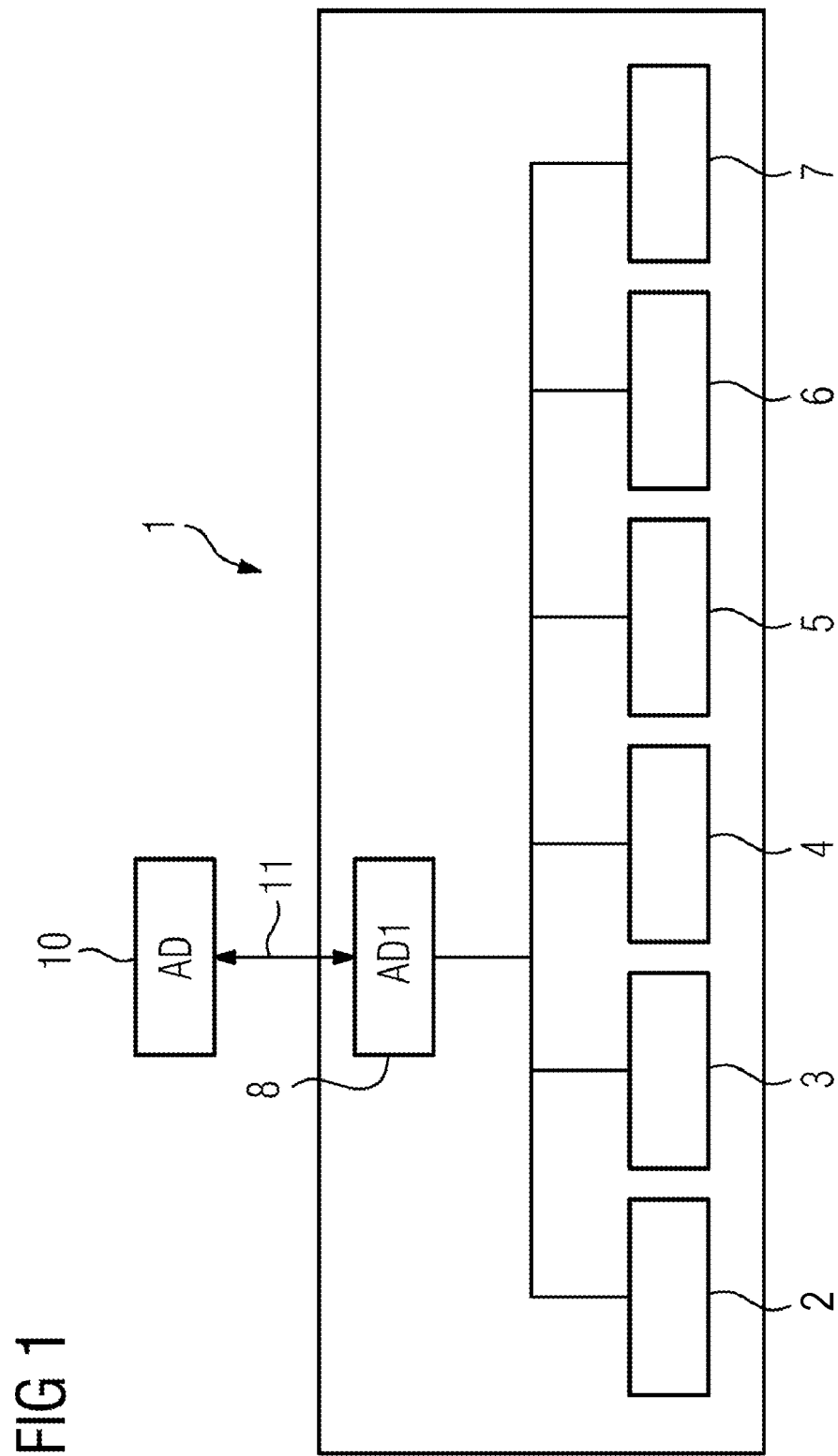
FIG. 1 is a principle drawing of an additive manufacturing apparatus.

The additive manufacturing apparatus 1 comprises a plurality of hard- and/or software embodied functional units 2-7, e.g. a build material application unit 2 for applying layers of a build material in a build area of the additive manufacturing apparatus 1, an irradiation unit 3 for selectively irradiating and thereby, selectively consolidating layers of build material in a build area of the additive manufacturing apparatus 1 with at least one energy beam, a streaming unit 4 for creating a process gas stream, particularly through a process chamber of the additive manufacturing apparatus 1, a tempering unit 5 for tempering (cooling and/or heating) build material and/or wall portions of the additive manufacturing apparatus 1 or wall portions of a powder module, an unpacking unit 6 for unpacking built objects from surrounding build material, a build material handling unit 7 for handling of build material of the additive manufacturing apparatus 1, etc.

Operation of each of the functional units 2-7 may be controlled by a hard- and/or software embodied central control unit 8 of the additive manufacturing apparatus 1. The central control unit may also be considered as functional unit of the additive manufacturing apparatus 1.

FIG. 2 is a principle drawing of an additive manufacturing network 9. The additive manufacturing network 9 comprises a plurality of additive manufacturing apparatuses 1 located remote from each other, e.g. at remote additive manufacturing sites, i.e. additive manufacturing sites which may be located in different parts of a building, town, country, continent, etc.

Both the additive manufacturing apparatus 1 of FIG. 1 as well as the additive manufacturing network 9 of FIG. 2 are capable of executing a method for controlling operation of at least one additive manufacturing apparatus 1. An exemplary embodiment of the method will be described in the following:

According to a first step of the method, authorization data AD which contains authorization parameters that authorize the operation of at least one additive manufacturing apparatus 1 or at least one functional unit 2-7 thereof is supplied by/from an external data supply source 10. Hence, operation of a respective additive manufacturing apparatus 1 and/or the at least one functional unit 2-7 thereof is only possible when it is authorized by the authorization data AD and a respective authorization parameter thereof, respectively. This also means that changes to the operation, particularly changes to at least operational parameter, of an additive manufacturing apparatus 1 and/or a functional unit 2-7 thereof is only possible when it is authorized by the authorization data AD and a respective authorization parameter thereof, respectively. The authorization data AD can thus, be understood as authorized control data for controlling operation of a additive manufacturing apparatus 1 and/or of at least one functional unit 2-7 thereof. An authorization parameter can thus, be understood as an authorized control parameter for controlling operation of an additive manufacturing apparatus 1 and/or of a functional unit 2-7 thereof. Authorization data AD and/or authorization parameter can be pre-defined or pre-set, e.g. by an owner, operator, manufacturer. Typically, pre-defined or pre-set authorization parameters cannot be further modified by a third person.

As is clear from the fig., the external data supply source 10 does not form part of an additive manufacturing apparatus 1 or a functional unit 2-7 thereof. The external data supply source 10 may be located at an authorized entity, e.g. an operator, owner, manufacturer, distributor of an additive manufacturing apparatus 1 to be operated. The authorization data AD may thus, be supplied from the operator, owner, manufacturer or distributor of an additive manufacturing apparatus 1 to be operated. The external data supply source 10 is thus, remote from the additive manufacturing apparatus(es) 1 and/or functional unit(s) 2-7 whose operation shall be controlled.

According to a second step of the method, the authorization data AD is transmitted from the external supply source 10 to a control unit 8 of at least one additive manufacturing apparatus 1. As mentioned above, a respective control unit 8 is configured to control operation of the respective additive manufacturing apparatus 1 or at least one functional 2-7 unit thereof. The control unit 8 is configured to process transmitted authorization data AD so as to generate authorized control data for controlling operation of the additive manufacturing apparatus 1 and/or of at least one functional 2-7 unit thereof. Transmittal of authorization data AD (indicated by arrows 11) can be executed by appropriate transceiving devices, i.e. devices which are configured to transmit and/or receive data, assigned to or incorporated in the external data supply source 10 and the control unit 8 of an additive manufacturing apparatus 1. Transmittal may be based on any wired or wireless, if need be encoded, transmitting technology based on any communication standards, protocols, network, respectively.

According to a third step of the method, operation of at least one additive manufacturing apparatus 1 and/or at least one functional unit thereof 2-7 is controlled based on the transmitted authorization data AD. In such a manner, operation of an additive manufacturing apparatus 1 and/or functional units 2-7 thereof can be controlled since operation of the additive manufacturing apparatus 1 and/or functional units thereof 2-7 is only possible if it is authorized by the authorization data AD and authorization parameters, respectively. Since the authorization data AD and authorization parameters, respectively can be supplied from a remote location, an operator, owner, manufacturer, distributor or any other authorized person or entity is able to control and document operation of an additive manufacturing apparatus 1 from a remote location.

Hence, an operator, owner, manufacturer, distributor of an additive manufacturing network 9 or a manufacturer of parts, e.g. for the automotive-, aviation-, and medical-industry, can assure proper quality and documentation at each additive manufacturing site. The operator, owner, manufacturer, distributor of a respective additive manufacturing network 9 is also able to document that each additive manufacturing apparatus 1 of the additive manufacturing network 9 is or was operated with e.g. set object parameters, set process parameters, set build material parameters, set personnel, etc. By means of respective authorization data AD, the operator, owner, manufacturer, distributor can also allocate specific build jobs to specific additive manufacturing apparatuses 1 which are (only) authorized to be operated for processing the respective build job.

A respective authorization parameter may be or may comprise an object authorization parameter. The object authorization parameter may refer to at least one three-dimensional object and/or at least one object parameter which is authorized to be additively manufactured with a specific additive manufacturing apparatus 1, e.g. of the additive manufacturing network 9.

A respective object authorization parameter may contain/describe the general kind of object which is authorized to be additively manufactured with a specific additive manufacturing apparatus 1. Hence, an object authorization parameter may authorize specific kinds of objects which may solely manufactured with the respective additive manufacturing apparatus 1.

A respective object authorization parameter may additionally or alternatively contain/describe the geometrical, i.e. constructive and/or functional, properties of at least one object which is generally authorized to be additively manufactured with a specific additive manufacturing apparatus 1. Hence, an object authorization parameter may authorize specific geometrical properties of an object authorized to be manufactured with the respective additive manufacturing apparatus 1.

A respective object authorization parameter may additionally or alternatively contain/describe a minimum or maximum manufacturing number of an object which is generally authorized to be additively manufactured with a specific additive manufacturing apparatus 1. The minimum or maximum manufacturing number may indicate how many units of the authorized object are authorized to be manufactured at the minimum or maximum. Hence, an object authorization parameter may authorize a minimum or maximum number of units of an object authorized to be manufactured with the respective additive manufacturing apparatus.

A respective authorization parameter may additionally or alternatively be or comprise a build material authorization parameter. The build material authorization parameter may refer to at least one build material and/or at least one build material parameter which is authorized to be used for additive manufacturing with a specific additive manufacturing apparatus 1, e.g. of the additive manufacturing network 9.

A respective build material authorization parameter may contain/describe at least one chemical parameter of the build material which is authorized to be used for additive manufacturing. Hence, a build material authorization parameter may authorize a specific chemical parameter of a build material, e.g. chemical composition and/or chemical reactivity, authorized to be used.

A respective build material authorization parameter may additionally or alternatively contain/describe at least one physical parameter of the build material which is authorized to be used for additive manufacturing. Hence, a build material authorization parameter may authorize specific physical properties of a build material, e.g. density, humidity, magnetism, temperature, authorized to be used.

A respective build material authorization parameter may additionally or alternatively contain/describe at least one grain/particle parameter of the build material which is authorized to be used for additive manufacturing. Hence, a build material authorization parameter may authorize a specific grain/particle parameter, e.g. grain shape, minimum grain size, maximum grain size, grain size distribution, of a build material authorized to be used.

A respective authorization parameter may additionally or alternatively be or comprise a process authorization parameter. The process authorization parameter may refer to at least one process parameter which is authorized to be used for additive manufacturing with a specific additive manufacturing apparatus 1, e.g. of the additive manufacturing network 9.

A respective process authorization parameter may contain/describe at least one energy beam parameter of an energy beam which is authorized to be used for additive manufacturing. Hence, a process authorization parameter may authorize a specific energy beam parameter of an energy beam, e.g. energy beam intensity, motion profile relative to a build material layer, velocity along build a material layer, authorized to be used.

A respective process authorization parameter may additionally or alternatively contain/describe a minimum or maximum number of energy beams which is authorized to be used for additive manufacturing. The minimum or maximum number indicates how many energy beams are authorized to be used at the minimum or at the maximum. Hence, a process authorization parameter may authorize a minimum or maximum number of energy beams authorized to be used.

A respective process authorization parameter may additionally or alternatively contain/describe at least one build material application parameter, e.g. a clearance (defining the thickness of a layer) of a powder application unit to the build area, a motion profile of a powder application unit relative to the build area, the velocity of a powder application unit relative to the build area, which is authorized to be used for additive manufacturing.

A respective process authorization parameter may additionally or alternatively contain/describe at least one ambient parameter of the process chamber and/or at least one powder module, e.g. a dose module, build module, overflow module, of an additive manufacturing apparatus 1 which is authorized to be used for additive manufacturing. Hence, an ambient parameter may authorize a specific ambient parameter of the process chamber and/or at least one powder module, e.g. inert atmosphere, humidity, temperature, pressure, authorized to be used.

A respective authorization parameter may additionally or alternatively be or comprise an apparatus status authorization parameter. The apparatus status authorization parameter may refer to at least one check-, service- or calibration-status of an additive manufacturing apparatus 1 or at least one functional unit 2-7 thereof which needs to be fulfilled to authorize operation. Hence, operation of the additive manufacturing apparatus 1 or a respective functional unit 2-7 thereof may only be authorized if a respective check-, service- or calibration-status is fulfilled.

A respective authorization parameter may additionally or alternatively be or comprise a time and/or location authorization parameter. The time and/or location authorization parameter may refer to at least one time or time interval and/or location in which operation of an additive manufacturing apparatus 1 or at least one functional 2-7 unit thereof is authorized. Hence, operation of an additive manufacturing apparatus 1 or a functional unit thereof 2-7 may only be authorized at certain times or within certain time intervals, e.g. at certain times, days, months, years, etc., and/or at certain locations or manufacturing sites, e.g. in certain buildings, towns, countries, continents, respectively.

A respective authorization parameter may additionally or alternatively be or comprise a user authorization parameter. The user parameter authorization may refer to at least one user parameter of at least one user which is authorized to operate an additive manufacturing apparatus 1 or at least one functional unit 2-7 of thereof.

A respective user authorization parameter may contain/describe a degree of education and/or position and/or personal data, e.g. age, sex, seniority, etc., of a user willing to operate at least one additive manufacturing apparatus 1. Hence, a user authorization parameter may authorize a specific user, e.g. an employee, authorized to operate at least one additive manufacturing apparatus and/or a functional unit thereof.

The user authorization parameter may be approved during a login procedure of a potential user of an additive manufacturing apparatus 1 at a login interface, e.g. at the respective additive manufacturing apparatus 1. A login procedure may comprise detecting, e.g. scanning, of user identification means, e.g. an ID-card, biometric features, e.g. finger-print, retina, etc., of the user. A successful login procedure may require approval of at least one user authorization parameter.

Authorization data information ADI specifying the authorization data AD used during an authorized additive manufacturing process can be generated at each additive manufacturing apparatus 1. The generated authorization data information ADI may be provided as a marker, e.g. a serial number, geometrical marker, a bar-code, a QR-code, etc. to a object which was manufactured by an authorized additive manufacturing apparatus 1. In such a manner, documentation of additive manufacturing processes can be achieved in reliable manner since all relevant information, i.e. particularly the authorization data used during an authorized additive manufacturing process, can be "stored" on an object which was manufactured by an authorized additive manufacturing apparatus. Respective markers can be additively built.

In order to protect the authorization data AD from unauthorized access, the authorization data AD can be deleted after completion of a specific additive manufacturing process or a specific build job, respectively in which at least one object was additively built. Additionally or alternatively, the authorization data AD can be sent back to the external data supply source 10 after completion of a specific additive manufacturing process. Further additionally or alternatively, the authorization data AD can be processed in such a manner that it cannot be accessed by a user of the additive manufacturing apparatus 1.

The invention claimed is:

1. A method for controlling operation of at least one additive manufacturing apparatus, or a functional unit thereof, for additively manufacturing three-dimensional objects through successive layerwise selective irradiation and consolidation of layers of a powdered build material which can be consolidated by an energy beam, the method comprising:
   supplying authorized control data which contains at least one authorization parameter that authorizes the operation of the at least one additive manufacturing apparatus or the at least one functional unit of the at least one additive manufacturing apparatus from an external data supply source, wherein the external data supply source is remotely located from the at least one additive manufacturing apparatus, wherein the authorized control data, the at least one authorization parameter, or both are pre-defined or pre-set without modification by a third person,
   transmitting the authorized control data from the external data supply source to a control unit of the at least one additive manufacturing apparatus, the control unit being configured to assign and control operation of the at least one additive manufacturing apparatus or the at least one functional unit of the at least one additive manufacturing apparatus, and
   controlling operation of the at least one additive manufacturing apparatus or the at least one functional unit of the at least one additive manufacturing apparatus, which is authorized to be operated, based on the transmitted authorized control data,
   wherein the at least one authorization parameter is or comprises a build material authorization parameter, the build material authorization parameter referring to at least one build material parameter which is authorized to be used for additive manufacturing with the at least one additive manufacturing apparatus.

2. The method according to claim 1, wherein the at least one authorization parameter further is or comprises an object authorization parameter, the object authorization parameter referring to at least one object parameter which is authorized to be used for additive manufacturing with the at least one additive manufacturing apparatus.

3. The method according to claim 1, wherein the build material authorization parameter contains:
   at least one chemical parameter of a build material which is authorized to be used; and/or
   at least one physical parameter of a build material which is authorized to be used; and/or
   at least one grain parameter of a build material which is authorized to be used.

4. The method according to claim 1, wherein authorized control data information specifying the authorized control data used during an authorized build process of the at least one additive manufacturing apparatus is generated and the authorized control data information is provided as a marker to a three-dimensional object which was manufactured with the authorized additive manufacturing apparatus.

5. The method according to claim 1, wherein the authorized control data is supplied in encoded form.

6. The method according to claim 1, wherein the authorized control data for a specific additive manufacturing process is deleted after completion of the specific additive manufacturing process in which at least one three-dimensional object was additively built and/or wherein the authorized control data cannot be accessed by a user of the at least one additive manufacturing apparatus.

7. The method according to claim 1, wherein the authorized control data is supplied from an owner of the at least one additive manufacturing apparatus to be operated, an operator of the at least one additive manufacturing apparatus to be operated, a manufacturer of the at least one additive manufacturing apparatus to be operated, or an authorized distributor of the at least one additive manufacturing apparatus to be operated.

8. An additive manufacturing apparatus for additively manufacturing three-dimensional objects through successive layerwise selective irradiation and consolidation of layers of a powdered build material which can be consolidated with an energy beam, comprising a control unit which is configured to:
   process transmitted authorized control data which contains at least one authorization parameter that authorizes operation of at least one additive manufacturing apparatus or at least one functional unit of the at least one additive manufacturing apparatus supplied from an external data supply source, wherein the external data supply source is remotely located from the at least one additive manufacturing apparatus, wherein the authorized control data, the at least one authorization parameter, or both are pre-defined or pre-set without modification by a third person, and
   control operation of the at least one additive manufacturing apparatus or the at least one functional unit of the at least one additive manufacturing apparatus, which is authorized to be assigned and operated, based on received authorized control data,
   wherein the at least one authorization parameter is or comprises a build material authorization parameter, the build material authorization parameter referring to at least one build material parameter which is authorized to be used for additive manufacturing with the at least one additive manufacturing apparatus.

9. An additive manufacturing network, comprising at least one external data supply source and a plurality of additive manufacturing apparatuses for additively manufacturing three-dimensional objects through successive layerwise selective irradiation and consolidation of layers of a powdered build material which can be consolidated with an energy beam located remote from each other, wherein each additive manufacturing apparatus comprises a control unit which is configured to:

process transmitted authorized control data which contains at least one authorization parameter that authorizes operation of a respective additive manufacturing apparatus or at least one functional unit of the respective additive manufacturing apparatus supplied from the external data supply source, wherein the external data supply source is remotely located from the at least one additive manufacturing apparatus, wherein the authorized control data, the at least one authorization parameter, or both are pre-defined or pre-set without modification by a third person, and control operation of the respective additive manufacturing apparatus or the at least one functional unit of the respective additive manufacturing apparatus, which is authorized to be assigned and operated, based on received authorized control data, wherein the at least one authorization parameter is or comprises a build material authorization parameter, the build material authorization parameter referring to at least one build material parameter which is authorized to be used for additive manufacturing with the at least one additive manufacturing apparatus.

10. The method according to claim 4, wherein the marker comprises: a serial number, a bar-code, and/or a QR-code.

11. The apparatus according to claim 8, wherein authorized control data information specifying the authorized control data used during an authorized build process of the at least one additive manufacturing apparatus is generated and the authorized control data information is provided as a marker to a three-dimensional object which was manufactured with the authorized additive manufacturing apparatus.

* * * * *